(12) United States Patent
Ayichew et al.

(10) Patent No.: US 11,851,037 B2
(45) Date of Patent: Dec. 26, 2023

(54) PEDAL BRAKE ELECTRIC BOOST FOR ADVANCED VEHICLE PLATFORMS

(71) Applicant: BWI (Shanghai) Co., Ltd., Shanghai (CN)

(72) Inventors: Efrem Endale Ayichew, Troy, OH (US); Eric Michael Higgins, Dayton, OH (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 293 days.

(21) Appl. No.: 17/138,859

(22) Filed: Dec. 30, 2020

(65) Prior Publication Data
US 2021/0197783 A1 Jul. 1, 2021

Related U.S. Application Data

(60) Provisional application No. 62/955,823, filed on Dec. 31, 2019.

(30) Foreign Application Priority Data

Nov. 23, 2020 (CN) .......................... 202011320221.9

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 13/142* (2013.01); *B60T 13/686* (2013.01)

(58) Field of Classification Search
CPC .... B60T 13/745; B60T 13/686; B60T 8/4081; B60T 8/4086; B60T 11/18; B60T 7/042; B60T 13/142
See application file for complete search history.

(56) References Cited

U.S. PATENT DOCUMENTS 8,850,955 B2 10/2014 Isakson
10,919,508 B2* 2/2021 Reuter .................... B60T 11/22
(Continued)

FOREIGN PATENT DOCUMENTS

CN 103237700 A 8/2013
CN 105142999 A 12/2015
(Continued)

OTHER PUBLICATIONS

First Office Action and search report dated Mar. 23, 2022 for counterpart Chinese patent application No. 202011320221.9, along with machine EN translation downloaded from EPO.

*Primary Examiner* — Bradley T King
(74) *Attorney, Agent, or Firm* — William H. Honaker; DICKINSON WRIGHT PLLC

(57) ABSTRACT

A pedal brake assembly comprises a master cylinder block defining a bore extending along a center axis. At least one brake piston is slidably disposed in the bore. A push rod, having a body portion and an end portion, extends between a first end and a second end. The second end is coupled to a brake pedal. A housing defines a channel for receiving the push rod. An actuator couples to the at least one brake piston. The body portion is slidably disposed in the channel. The end portion is in an abutment relationship with the housing and defines a hole extending from the first end to the body portion. A plunger is slidably disposed in the end portion for engaging the at least one brake piston whereby the push rod and the actuator are independently movable along the center axis.

17 Claims, 4 Drawing Sheets

(51) Int. Cl.
*B60T 13/14* (2006.01)
*B60T 13/68* (2006.01)

(56) References Cited

U.S. PATENT DOCUMENTS

| | | | |
|---|---|---|---|
| 11,338,784 B2* | 5/2022 | Fukayama | B60T 7/042 |
| 2012/0073286 A1* | 3/2012 | Takayama | B60T 13/745 |
| | | | 60/538 |
| 2014/0109565 A1* | 4/2014 | Chiba | B60T 8/409 |
| | | | 60/445 |
| 2014/0290476 A1 | 10/2014 | Michalski et al. | |
| 2016/0016568 A1* | 1/2016 | Ishida | B60T 13/162 |
| | | | 303/15 |
| 2016/0016569 A1* | 1/2016 | Odaira | B60T 8/4077 |
| | | | 303/15 |
| 2016/0031425 A1* | 2/2016 | Misunou | B60T 8/4081 |
| | | | 60/585 |
| 2016/0107628 A1* | 4/2016 | Mahnkopf | B60T 13/575 |
| | | | 303/115.2 |
| 2018/0162330 A1* | 6/2018 | Odaira | B60T 8/171 |
| 2018/0244251 A1* | 8/2018 | Masuda | B60T 11/236 |

FOREIGN PATENT DOCUMENTS

| | | |
|---|---|---|
| CN | 106715210 A | 5/2017 |
| CN | 110395234 A | 11/2019 |

* cited by examiner

PEDAL BRAKE ELECTRIC BOOST FOR ADVANCED VEHICLE PLATFORMS

CROSS REFERENCE TO RELATED APPLICATION

The present application claims the benefit of U.S. Provisional Patent Application Ser. No. 62/955,823, filed Dec. 31, 2019, and Chinese Patent Application No. 202011320221.9, filed on Dec. 23, 2020, the entire contents of which are incorporated herein by reference.

BACKGROUND OF THE INVENTION

1. Field of the Invention

The present invention relates generally to a pedal brake assembly for a vehicle and a brake system including the pedal brake assembly.

2. Description of the Prior Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a "brake-by-wire" technique. To accomplish this, the brake pedal in effect becomes a "joystick", so it must be connected to a travel and/or force sensor in order to send a signal to the system ECU that will interpret this as driver's intent of a desired vehicle deceleration or brake pressure in situations where the vehicle regenerative braking is disabled or faulty. In addition, the brake pedal "feel" must be simulated by the appropriate force-travel relationship and must also have the ability to be isolated from directly applying the master cylinder to the wheel brakes.

As first noted regarding the proliferation of hybrid and electric vehicles in the world, there is another phenomenon taking place as well, being the push for autonomous, self-driving vehicles. As a result, the Society of Automotive Engineers (SAE) has developed guidelines for the path to autonomy range from level 0 to level 5. Level 0 is no automation. Level 1 is driver assistance required, e.g. adaptive cruise control. Level 2 is partial automation, e.g. Cadillac Super Cruise—driver keep hand on steering wheel. Level 3 is conditional automation, e.g. 2019 model of Audi Traffic Jam Pilot. Level 4 is high automation, e.g. self-driving vehicle with some very specific speed restrictions. Level 5 is full automation where the vehicle can operate at the same level as a human driver, hence the vehicle does not have traditional driver command sensors.

Vehicular hydraulic brake systems, including those used in automobiles, trucks, buses, motor homes and the like, typically include a push rod actuated master cylinder which generates a hydraulic pressure that is transmitted through brake lines to actuate hydraulic brakes attached to the wheels of the vehicle, for slowing or stopping the wheels. In such systems, it is desirable to incorporate a power brake booster for amplifying or augmenting the force applied to a brake pedal connected to the push rod, so that the amount of force that an operator is required to apply to the pedal for stopping or slowing the vehicle is significantly reduced. In some of these systems, it is also desirable to enable application of a braking force independently of an operator input and/or to enable application of a braking force automatically without the necessity of an operator input.

Many existing brake systems provide the power-assist feature using engine vacuum to boost the operation of the master cylinder. In vehicles where engine vacuum is not available, such as various advanced combustion control (e.g. start/stop), hybrid electric, or all electric powered vehicles, it is desirable to electrically provide a brake boost feature that provides similar functionality to that of vacuum or other boost designs. Various electrically powered boost designs have been proposed, but these designs generally have significant limitations, including limitations related to changing the essential brake actuation mechanism such that the manual push rod actuated brake function is no longer possible without articulating, in some fashion, the electrical actuation path. Other electric systems have retained aspects of the manual brake function, but these designs generally undesirably extend the overall length of the combined master cylinder and electric booster thereby consuming space under the vehicle hood.

One such a brake system is disclosed in U.S. Patent Application No. 2018/0001881. The brake system comprises a master cylinder block. The master cylinder block defines a bore extending along a center axis. At least one brake piston is slidably disposed in the bore. A push rod extends along the center axis between a first end and a second end for moving the at least one brake piston in the bore. The second end is coupled to a brake pedal for allowing a user to manually move the at least one brake piston. A housing, attached to the master cylinder block, defines a channel extending through the housing and receiving the push rod and allow the push rod to be slidable in the housing. An actuator couples to the at least one brake piston for driving the at least one brake piston axially along the center axis between an opened position and a compressed position. The push rod includes a body portion and an end portion. The body portion is slidably disposed in the channel. The end portion is in an abutment relationship with the housing. The end portion defines a hole extending from the first end to the body portion.

SUMMARY OF THE INVENTION

The present invention in its broadest aspect provides for a pedal brake assembly and a brake system having less parts thereby reducing the manufacturing cost. The present invention also provides a single master cylinder block for conducting both electric boost and pedal brake post. In addition, the present invention provides a brake system that has a seamless interaction between pedal braking and advance vehicle braking features. Furthermore, the present invention provides a brake system that satisfies at least level 2 of the vehicle autonomy range. The present invention provides indifferent interface with the Electronic Stability Control (ESC) system to transitional pedal braking via novel brake pressure return path.

It is one aspect of the present invention to provide a pedal brake assembly for a vehicle. The pedal brake assembly comprises a master cylinder block defining a bore extending along a center axis. At least one brake piston is slidably disposed in the bore. A push rod extends along the center axis between a first end and a second end for moving the at least one brake piston in the bore. The second end is coupled to a brake pedal for allowing a user to manually move the at least one brake piston. A housing, attached to the master cylinder block, defines a channel extending through the housing and receiving the push rod and allowing the push rod to be slidable in the housing. An actuator couples to the at least one brake piston for driving the at least one brake piston axially along the center axis between an opened position and a compressed position. The push rod includes a body portion and an end portion. The body portion is slidably disposed in the channel. The end portion is in an abutment relationship with the housing. The end portion defines a hole extending from the first end to the body portion. A plunger is slidably disposed in the end portion for engaging the at least one brake piston whereby the push rod and the actuator are independently movable along the center axis for pushing the at least one brake piston from the opened position to the compressed position.

It is another aspect of the present invention to provide a pedal brake assembly for a vehicle. The pedal brake assembly comprises a master cylinder block defining a bore extending along a center axis. At least one brake piston is slidably disposed in the bore. A push rod extends along the center axis between a first end and a second end for moving the at least one brake piston in the bore. The second end is coupled to a brake pedal for allowing a user to manually move the at least one brake piston. A housing, attached to the master cylinder block, defines a channel extending through the housing and receiving the push rod and allowing the push rod to be slidable in the housing. An actuator couples to the at least one brake piston for driving the at least one brake piston axially along the center axis between an opened position and a compressed position. The push rod includes a body portion and an end portion. The body portion is slidably disposed in the channel. The end portion is in an abutment relationship with the housing. The end portion defines a hole extending from the first end to the body portion. The housing defines a first pocket and a second pocket, spaced apart from one another, extending annularly about the body portion of the push rod. The first pocket is in communication with the hole and a reservoir. The second pocket is communication with a pedal feel emulator.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
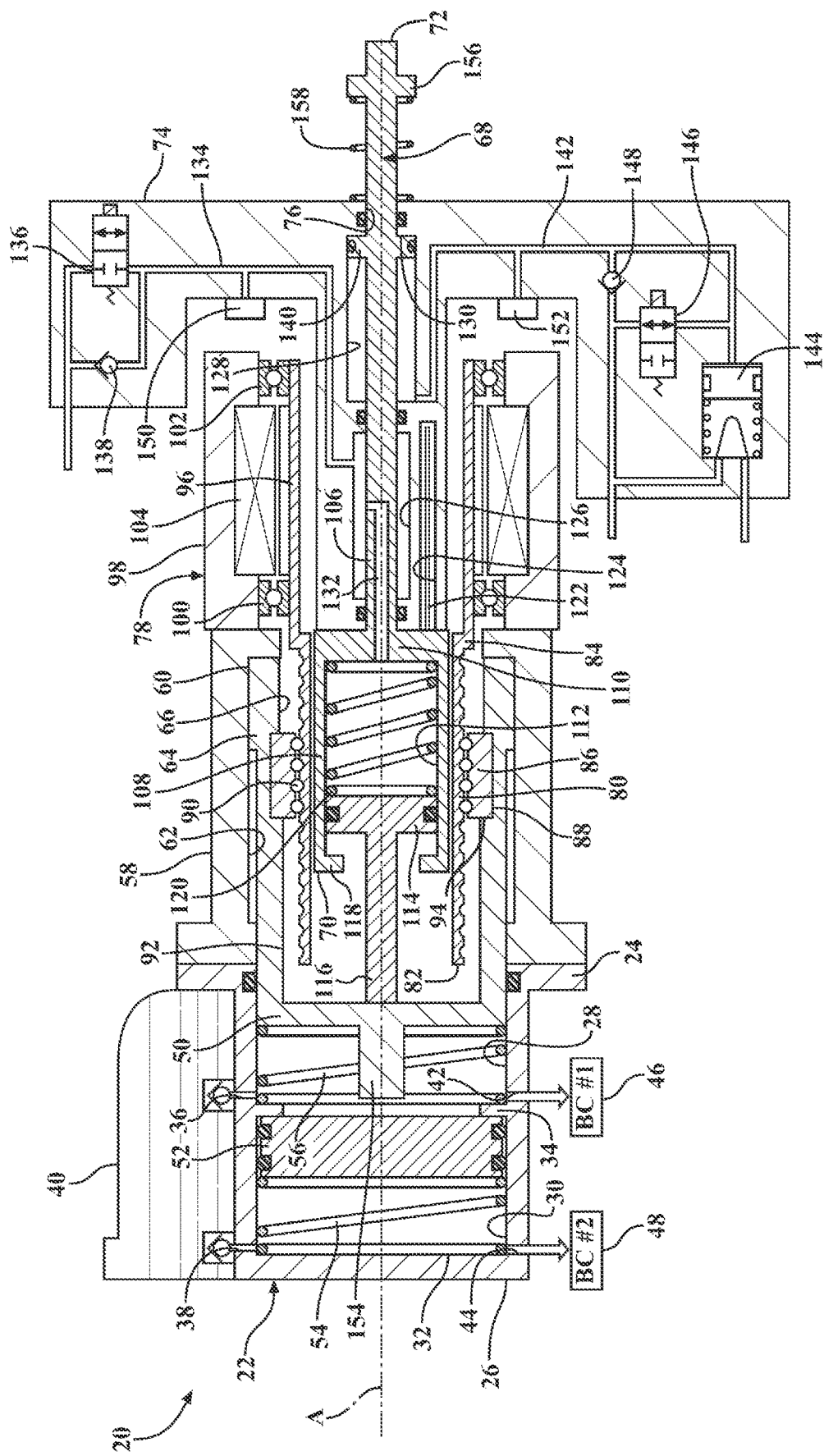
FIG. 1 is a cross-sectional perspective view of a pedal brake assembly for a vehicle constructed in accordance with one embodiment of the present invention, the pedal brake assembly is in a neutral position wherein the vehicle is without power and the pedal brake assembly is unapplied.

Referring to the Figures, wherein like numerals indicate corresponding parts throughout the several views, a pedal brake assembly 20 for use in vehicle constructed in accordance with one embodiment of the present invention is generally shown in FIG. 1.

As best shown in FIG. 1, the pedal brake assembly 20 includes a master cylinder block 22. The master cylinder block 22 has a front surface (not shown), a rear surface (not shown), a pair of side surfaces 24, 26, a top surface (not shown) and a bottom surface (not shown). The front surface and a rear surface of the master cylinder block are parallel and spaced from one another. The side surfaces 24, 26, also parallel and spaced from one another, connects the front surface and the rear surface. The top surface and the bottom surface connects the front surface, the rear surface, and the side surfaces 24, 26 to one another to establish the rectangular shape.

A side surface 24 of the pair of side surfaces 24, 26 defines a bore 28, 30, having a generally cylindrical shape, extending along a center axis A and terminating at a distal end 32. The distal end 32 is spaced apart from another side surface 26 of the pair of side surfaces 24, 26. In other words, the bore 28, 30 extends from the one side surface 24 towards the another side surface 26, along the center axis A, and terminates at the distal end 32 in the master cylinder block 22, spaced apart from the another side surface 26. A projection 34, located in the bore 28, 30, divides the bore 28, 30 into a primary chamber 28 and a secondary chamber 30. The secondary chamber 30 extends from the distal end 32 to the projection 34. The primary chamber 28, located adjacent the secondary chamber 30, extends from the projection 34 to the one side surface 24 of the master cylinder block 22.

The master cylinder block 22 defines a primary port 36 and a secondary port 38, spaced apart from one another. The secondary port 38, located on the top surface of the master cylinder block 22, is in communication with the secondary chamber 30 adjacent to the distal end 32. The primary port 36, located on the top surface of the master cylinder block 22 and spaced apart from the secondary port 38, is in communication with the primary chamber 28 adjacent the projection 34. The primary port 36 and the secondary port 38 are in communication with a fluid reservoir 40. The fluid reservoir 40 contains a brake fluid for supplying the brake fluid to the bore 28, 30 via the primary port 36 and the secondary port 38. The master cylinder block 22 further defines a primary brake supply port 42 and a secondary brake supply port 44. The primary brake supply port 42, located in the primary chamber 28 and adjacent to the projection 34, is in fluid communication with a first brake circuit 46 for supplying the brake fluid to the first brake circuit 46. The secondary brake supply port 44, located in the secondary chamber 30 and adjacent to the distal end 32, is in fluid communication with a second brake circuit 48 for supplying the brake fluid to the second brake circuit 48.

At least one brake piston 50, 52 is slidably disposed in the bore 28, 30 for applying a fluid pressure to the first brake circuit 46 and the second brake circuit 48 via the primary brake supply port 42 and the secondary brake supply port 44. According to one embodiment of the present invention, the at least one brake piston 50, 52 includes a primary piston 50 and a secondary piston 52 disposed in a tandem relationship with one another. The secondary piston 52, having a generally cylindrical shape, is located in the secondary chamber 30 of the bore 28, 30 adjacent to the distal end 32. The primary piston 50, having a generally U-shaped cross-section, is located in the primary chamber 28 spaced apart from the secondary piston 52. A first return spring 54, located in the secondary chamber 30, extends helically about the center axis A between the distal end 32 and the secondary piston 52 for biasing the secondary piston 52 against the projection 34 to define an original position for the secondary piston 52. A second return spring 56, located in the primary chamber 28, extends helically about the center axis A between the projection 34 and the primary piston 50 for biasing the primary piston 50 axially away from the projection 34 to define an original position for the primary piston 50. It should be appreciated that the first return spring 54 and the second return spring 56 helps to return the primary piston 50 and the secondary piston 52 to their respective original positions. In addition, as the first return spring 54 and the second return spring 56 returns the primary piston 50 and the secondary piston 52 to their original position, the first return spring 54 and the second return spring 56 helps to replenish the brake fluid in the primary chamber 28 and the secondary chamber 30 by creating a negative pressure and draw the brake fluid from the fluid reservoir 40.

A casing 58, having a generally tubular shape, is disposed over the primary piston 50 extending annularly about the center axis A for securing the primary piston 50 and the secondary piston 52 in the bore 28, 30. The casing 58 has an interior surface 60 extending annularly about the center axis A. The interior surface 60 of the casing 58 defines a plurality of slots 62 extending along the interior surface 60 parallel to the center axis A. The primary piston 50 includes a plurality of nubs 64 extending radially outwardly from the primary piston 50 and into the slots 62 to allow the primary piston 50 to slide in the casing 58 and prevent the primary piston 50 from rotating in the casing 58. In other words, the nub-slot type engagement provides an anti-rotational purpose to prevent the primary piston 50 from rotating in the casing 58 while the primary piston 50 is allowed to slide axially along axis A.

The primary piston 50 defines a compartment 66, having a generally cylindrical shape, extending along the center axis A. A push rod 68, having a generally cylindrical shape, extends along the center axis A between a first end 70 and a second end 72 for moving the at least one brake piston 50, 52 axially along the center axis inside the bore 28, 30. The first end 70 of the push rod 68 is located in the compartment 66 of the primary piston 50 and spaced apart, radially and axially, from the primary piston 50. The second end 72 of the push rod 68 couples to a brake pedal (not shown) for allowing a user to operate the at least one brake piston 50, 52 along the center axis A via the brake pedal to supply the brake fluid to the first brake circuit 46 and the second brake circuit 48. A housing 74, located on the center axis A and axially spaced apart from the casing 58, defines a channel 76 extending through the housing 74 to receive the push rod 68 and allow the push rod 68 to slide within the channel 76 of the housing 74.

An actuator 78, disposed between the housing 74 and the casing 58, couples to the primary piston 50 for driving the primary piston 50 axially along the center axis A from the original position to a first position. In the first position, the primary piston 50 and the secondary piston 52 are moved axially toward the distal end 32 thereby applying a brake fluid pressure to supply the brake fluid to the first brake circuit 46 and the second brake circuit 48, respectively. In their original position, as previously described, the primary piston 50 is biased axially away from the projection 34 by the second return spring 56 and the secondary piston 52 is biased against the projection 34 by the first return spring 54.

The actuator 78 includes a ball-screw 80, having a generally tubular shape and located in the compartment 66, extending about the push rod 68 and along the center axis A between a first opened end 82 and a second opened end 84. The first opened end 82 is located in the compartment 66. The second opened end 84 is located outside of the casing 58. The actuator 78 includes a ball-screw nut 86, located in the compartment 66, extending about the center axis A and coupled to an inner surface 88 of the primary piston 50, to couple the primary piston 50 with the actuator 78. A plurality of ball bearings 90 are located between the ball-screw nut 86 and the ball-screw 80 to convert a rotational movement of the ball-screw 80 into an axial movement for moving the ball-screw nut 86 along the ball-screw 80 to drive the primary piston 50 toward the projection 34 in the first position. It should be noted that the ball-screw nut 86 and the primary piston 50 are in sliding contact with one another thus the ball-screw nut 86, the primary piston 50 will not rotate but axially translate. The inner surface 88 of the primary piston 50 includes a protuberance 92. The protuberance 92 extends outwardly from the inner surface 88 and radially inwardly toward the center axis A presenting a shoulder 94 for receiving the ball-screw nut 86.

A rotor 96, having a generally tubular shape, attaches to the second opened end 84 of the ball-screw 80. The rotor 96 extends along the center axis A and annularly about the push rod 68. An enclosure 98, located adjacent to the casing 58, extends about the rotor 96 for retaining the rotor 96 in the enclosure 98. A plurality of rotor bearings 100, 102 are located between the enclosure 98 and the rotor 96 to allow the rotor 96 to rotate about the center axis A relative to the enclosure 98. According to one embodiment of the present invention, the plurality of rotor bearings 100, 102 include a first set of rotor bearings 100 and a second set of rotor bearings 102, space apart from one another. The first set of rotor bearings 100 are located adjacent to the casing 58, between the rotor 96 and the enclosure 98. The first set of rotor bearings 100 are disposed annularly about the center axis A and circumferentially spaced from one another. The second set of rotor bearings 102, axially spaced from the first set of rotor bearings 100, are located adjacent to the housing 74, between the enclosure 98 and the rotor 96. The second set of rotor bearings 102 are disposed annularly about the center axis A and circumferentially spaced from one another. A motor 104, located between the first set of rotor bearings 100 and the second set of rotor bearings 102, couples to the enclosure 98 and the rotor 96. The motor 104 is electrically connected to a power source for providing power to the motor 104 to rotate the rotor 96. According to one embodiment of the present invention, the motor 104 can be a permanent magnet synchronous motor attached to the enclosure 98 and the rotor 96.

The push rod 68 includes a body portion 106 and an end portion 108. The body portion 106, having a generally cylindrical shape, is slidably disposed in the channel 76 of the housing 74 and extends along the center axis A from the second end 72 to an intermediate end 110 located in the casing 58. The end portion 108 is located at the intermediate end 110 and in an abutment relationship with the housing 74. According to one embodiment of the present invention, the end portion 108 of the push rod 68 can have a larger diameter than the body portion 106. The end portion 108 defines a hole 112, having a generally cylindrical shape, extending from the first end 70 to the body portion 106. A plunger 114, 116 is slidably disposed in the hole 112 of the end portion 108 for engaging the primary piston 50 and tracking the position of the primary piston 50. The plunger 114, 116 has an upper part 114 and a lower part 116. The upper part 114, having a generally circular shape, is slidably disposed in the hole 112. The lower part 116, having a generally cylindrical shape, extends outwardly from the upper part 114 along the center axis A toward the primary piston 50. A lip 118, located at the first end 70 of the push rod 68, extends radially inwardly to the center axis A for retaining the plunger 114, 116 in the hole 112. A plunger spring 120, located in the hole 112, extends between the body portion 106 and the plunger 114, 116 for biasing the plunger 114, 116 against the lip 118 in the hole 112. A pedal travel sensor 122 attaches to the end portion 108 for measuring the travel distance of the push rod 68. The pedal travel sensor 122 extends into the housing 74 in a parallel relationship with the body portion 106. The housing 74 defines a conduit 124 extending in a parallel relationship with the center axis A for receiving the pedal travel sensor 122.

The housing 74 defines a first pocket 126 and a second pocket 128, 130, spaced apart from one another, extending annularly about the body portion 106 of the push rod 68. The push rod 68 defines a passage 132 extending along the push rod 68 and in communication with the hole 112 to establish a fluid communication between the first pocket 126 and the hole 112. The housing defines a first pathway 134 in fluid communication with a pedal application member 136, 138 and the first pocket 126 to allow the fluid reservoir 40 to supply the brake fluid to the hole 112 and drive the plunger 114, 116 toward the primary piston 50. According to one embodiment of the present invention, the pedal application member 136, 138, located in the housing 74, includes a pedal apply valve 136 and a first check valve 138. The pedal apply valve 136 and the first check valve 138 are located in the first pathway 134 in a parallel relationship with one another. According to one arrangement, the pedal apply valve 136 is a normally closed valve. The pedal apply valve 136 and the first check valve 138 are in fluid communication with the fluid reservoir 40 to allow the fluid reservoir 40 to supply the brake fluid to the first pocket 126. According to another embodiment of the present invention, instead of being connected to the fluid reservoir 40, the first pathway 134 can connect the pedal application member 136, 138 with a separate reservoir for supplying a more viscous leak resistant fluid.

The push rod 68 includes a flange 140, located in the second pocket 128, 130, extending radially outwardly from the center axis A dividing the second pocket 128, 130 into a first space 128 and a second space 130. The first space 128 is located adjacent to the first pocket 126 of the push rod 68. The second space 130 is located adjacent to the second end 72 of the push rod 68. The housing 74 defines a second pathway 142, located in the housing 74, in communication with the first space 128 and components of a pedal feel emulator 144, 146, 148 for providing a brake fluid pressure to the first space 128 to provide a resistance force to the user. According to one embodiment of the present invention, the pedal feel emulator 144, 146, 148 includes a feel cartridge 144, a pedal feel enable valve 146, and a second check valve 148. According to one arrangement, the pedal feel valve 146 is a normally closed valve. The feel cartridge 144, the pedal feel enable valve 146, and the second check valve 148 are located in the second pathway 142 in a parallel relationship relative to one another. According to another embodiment of the present invention, instead of being connected to the fluid reservoir 40, the second pathway 142 can connected the pedal feel emulator 144, 146, 148 to a separate reservoir for supplying a more viscous, leak resistant fluid.

A pedal apply pressure sensor 150 is disposed in the first pathway 134 between the fluid reservoir 40 and the first pocket 126 for monitoring fluid pressure in the first pathway 134. A feel pressure sensor 152 is disposed in the second pathway 142 between the pedal feel emulator 144, 146, 148 and the first space 128 for monitoring fluid pressure in the second pathway 142. The primary piston 50 includes an engagement member 154, disposed in the primary chamber 28, extending outwardly from the primary piston 50 and along the center axis A for engaging the secondary piston 52. The push rod 68 includes a spring seat 156, located adjacent to the second end 72 of the push rod 68, extending radially outwardly from the push rod 68. A push rod spring 158, located between the housing 74 and the spring seat 156, extends helically about the push rod 68.

Figure 2:
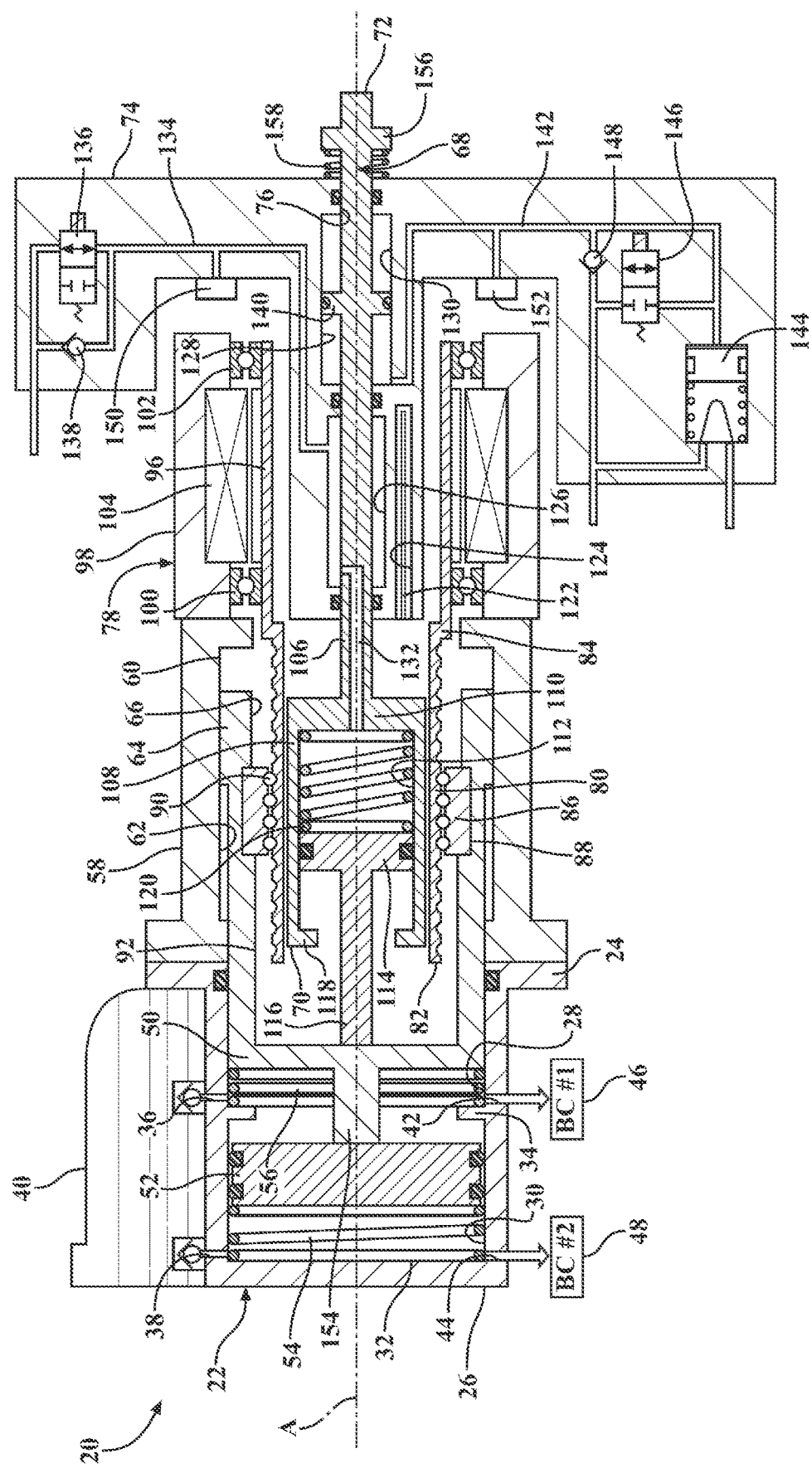
FIG. 2 is a cross-sectional perspective view of the pedal brake assembly operating in a pedal boost mode.

In operation, the pedal brake assembly 20 constructed in accordance with the present invention is operable between three different modes of operation. In the first mode of operation, also known as a pedal boost mode and as illustrated in FIG. 2, the pedal apply valve 136 and the pedal feel valve 146 are energized. In addition, during the first mode of operation, the driver communicates an intent for vehicle deceleration without transmitting human effort directly to the brake circuits, i.e. the vehicle is decelerated without the driver physically pressing the brake pedal. Accordingly, the pedal feel emulator 144, 146, 148 supplies a brake fluid pressure to the first space 128, thereby providing a sense of brake application feedback, i.e. pedal feel, to the driver. The brake apply valve 136 allows free movement of the brake fluid in and out of the first pathway 134, the first pocket 126, the passage 132, and the hole 112. At the same time, the motor 104 rotates about the center axis A, the ball-screw 80 also rotates about the center axis A thereby driving the primary piston 50 axially along the center axis A via the ball-screw nut 86. In this first mode of operation, the plunger 116 tracks the position of the primary piston 50 without applying push force to the primary piston 50. In the event of an electrical boost failure, the pedal apply valve 136 will close and hydrostatically lock/trap the brake fluid inside the first pathway 134, the first pocket 126, the passage 132, and the hole 112. Accordingly, this arrangement allows the push rod 68 to push the plunger 116 and the primary piston 50 along the center axis A. In the first mode of operation, a blending of regenerative braking and spoiler brake is possible. In addition, it should be noted that the driver only operation, i.e. the manual operation, is independent from the operation of the motor 104, the ball-screw 80, and the ball-screw nut 86. In other words, the the driver only operation does not activate the motor actuation path.

Figure 3:
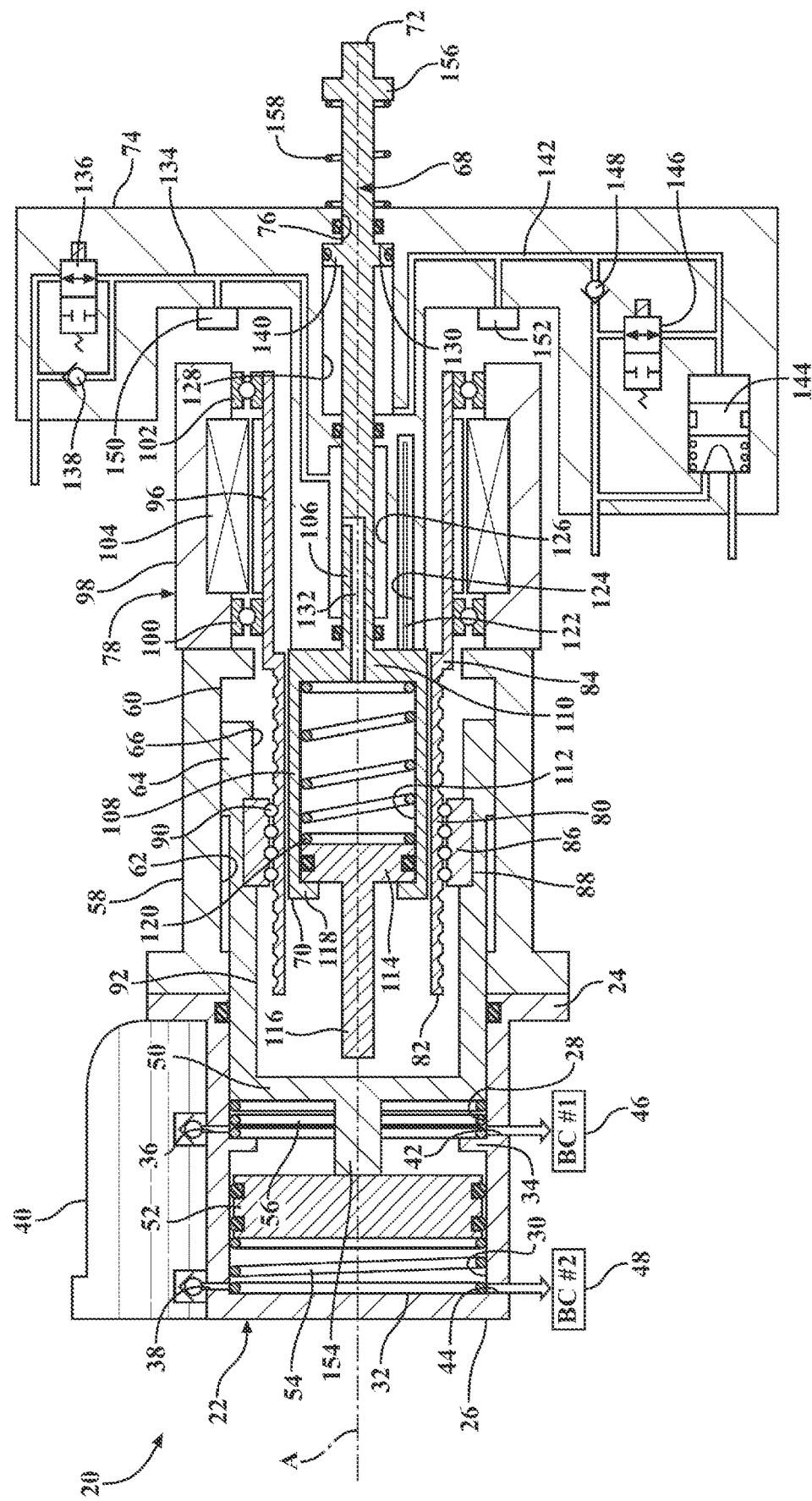
FIG. 3 is a cross-sectional perspective view of the pedal brake assembly operating in an ADAS/Autonomous mode.

In the second mode of operation, also known as ADAS/Autonomous mode and as illustrated in FIG. 3, the pedal apply valve 136 is energized while the pedal feel valve 146 is de-energized. This arrangement prevents lock-up of the driver pedal application system. To operate the brake system, the brake system first receives an electronic input from a vehicle control system and then, the brake system applies braking via the motor 104, the ball-screw 80, and the ball-screw nut 86 all without explicit input from the driver. In response to the brake system receiving the electronic input, the motor 104 of the actuator 96 rotates the rotor 96 which drives the primary piston 50 along the ball-screw 80 thereby applying the brake fluid pressure and supplying the brake fluid to the first brake circuit 46 and the second brake circuit 48. In other words, the push rod 68 and the actuator 96 can independent engage the primary piston 50 for applying a braking fluid pressure.

Figure 4:
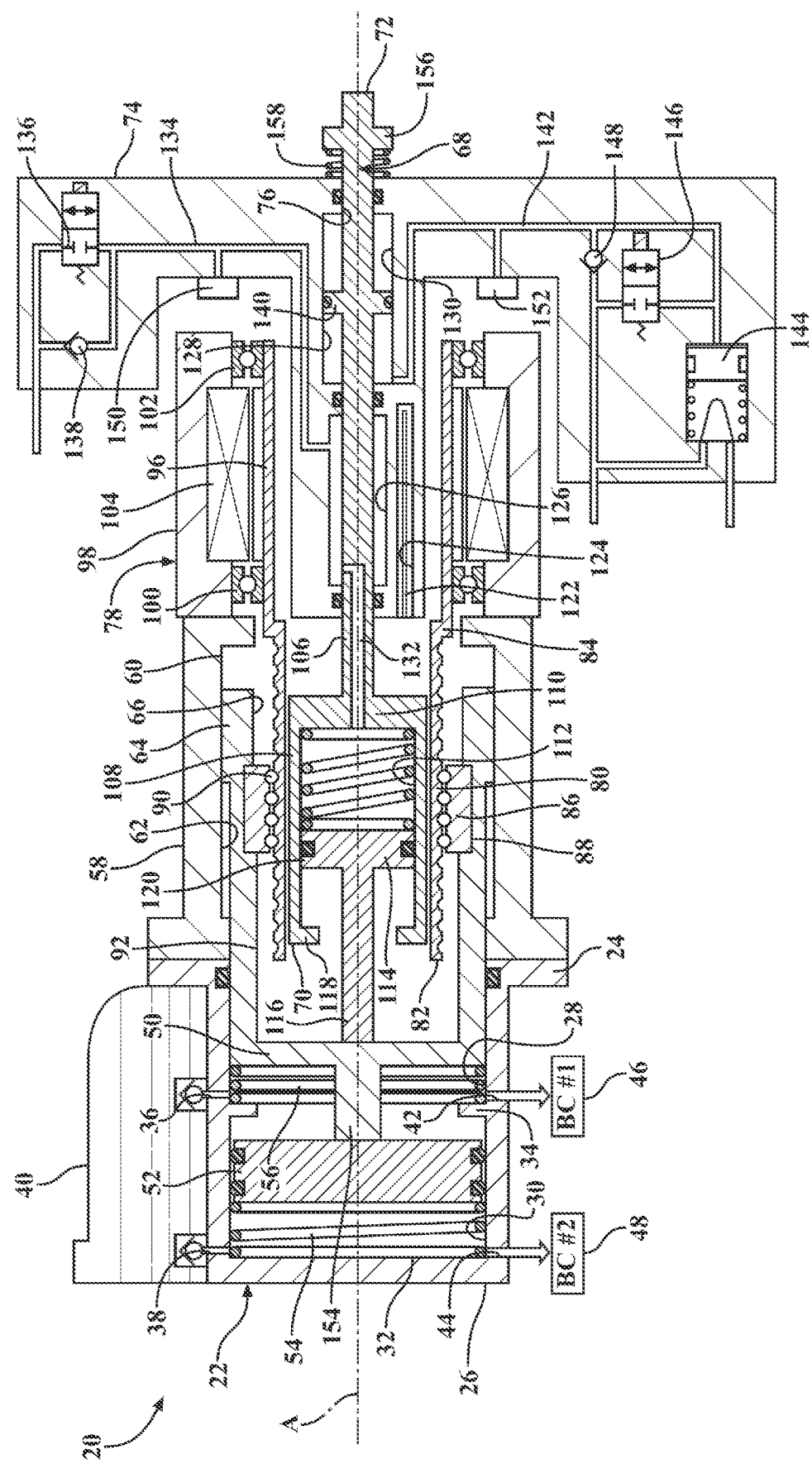
FIG. 4 is a cross-sectional perspective view of the pedal brake assembly operating in a fallback/manual mode.

In the third mode of operation, also known as fallback/manual mode and as illustrated in FIG. 4, in response to an electrical emergency, e.g. an electrical failure of the vehicle or the brake system, both the pedal apply valve 136 and the pedal feel valve 146 are in a de-energized state. This prevents the brake fluid from flowing from the fluid reservoir 40 into the first pocket 126 and the second pocket 128, 130. Accordingly, the operation of the push rod 68 is strictly based on the force applied by the user via the brake pedal. Thus, in the third mode of operation, the user manually generates the brake fluid pressure by applying a force to the push rod 68 thereby manually driving the push rod 68 toward the primary piston 50 and the secondary piston 52 to apply the brake fluid pressure and supply the brake fluid to the first brake circuit 46 and the second brake circuit 48.

It should be appreciated that the pedal brake assembly 20 according to an embodiment of the present invention is operable in a regenerative bleeding mode. In the regenerative bleeding mode, the pedal brake assembly 20 applies a reduced amount of braking in response to the input from the driver to allow for vehicle level propulsion system to activate regenerative vehicle deceleration and charge the onboard batteries—especially at higher vehicle speeds wherein regenerative recoup is most efficient. Typically, braking and regenerative braking are blended in a manner which use of regenerative braking is maximized while desired deceleration of the vehicle is fulfilled using both deceleration techniques.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A pedal brake assembly for a vehicle, comprising:
a master cylinder block defining a bore extending along a center axis;
at least one brake piston slidably disposed in said bore;
a push rod extending along said center axis between a first end and a second end for moving said at least one brake piston in said bore with said second end being coupled to a brake pedal for allowing a user to manually move said at least one brake piston;
a housing, attached to said master cylinder block, defining a channel extending through said housing and receiving said push rod and allowing said push rod to be slidable in said housing;
an actuator coupled to said at least one brake piston for driving said at least one brake piston axially along said center axis between an opened position and a compressed position;
said push rod including a body portion and an end portion with said body portion being slidably disposed in said channel and said end portion being in an abutment relationship with said housing, said end portion defining a hole extending from said first end to said body portion; and
a plunger slidably disposed in said end portion for engaging said at least one brake piston whereby said push rod and said actuator are independently movable along said center axis for pushing said at least one brake piston from said opened position to said compressed position.

2. The pedal brake assembly as set forth in claim 1 wherein said plunger includes an upper part and a lower part with said upper part being slidably disposed in said hole and said lower part extending outwardly from said upper part along said center axis toward said at least one brake piston.

3. The pedal brake assembly as set forth in claim 1 further including a lip, located at said first end of said push rod, extending radially inwardly to said center axis for retaining said plunger in said hole.

4. The pedal brake assembly as set forth in claim 1 further including a plunger spring, located in said hole, extending between said body portion of said push rod and said plunger.

5. The pedal brake assembly as set forth in claim 1 further including a pedal travel sensor attached to said end portion extending into said housing in a parallel relationship with said body portion.

6. The pedal brake assembly as set forth in claim 5 wherein said housing defines a conduit extending in a parallel relationship with said center axis for receiving said pedal travel sensor.

7. The pedal brake assembly as set forth in claim 1 wherein said housing defines a first pocket and a second pocket, spaced apart from one another, extending annularly about said body portion of said push rod.

8. The pedal brake assembly as set forth in claim 7 wherein said push rod defines a passage extending along said push rod and in communication with said hole to establish fluid communication between said first pocket and said hole; and
said housing defining a first pathway in fluid communication with a fluid reservoir and said first pocket to allow said reservoir to supply brake fluid to said hole.

9. The pedal brake assembly as set forth in claim 8 wherein said push rod includes a flange, located in said second pocket, and extending radially outwardly from said center axis dividing said second pocket into a first space and a second space.

10. The pedal brake assembly as set forth in claim 9 wherein said housing defines a second pathway in communication with said first space and a pedal feel emulator for providing a brake fluid pressure to said push rod to provide a resistance.

11. The pedal brake assembly as set forth in claim 10 further including a pedal apply pressure sensor disposed in said first pathway between said reservoir and said first pocket for monitoring fluid pressure in said first pathway.

12. The pedal brake assembly as set forth in claim 10 further including a feel pressure sensor disposed in said second pathway between said pedal feel emulator and said first space for monitoring fluid pressure in said second pathway.

13. The pedal brake assembly as set forth in claim 1 wherein said at least one brake piston including a primary piston and a secondary piston disposed in a tandem relationship with one another; and
said primary piston including an engagement member extending outwardly from said primary piston and along said center axis for engaging said secondary piston.

14. A pedal brake assembly for a vehicle, comprising:
a master cylinder block defining a bore extending along a center axis;
at least one brake piston slidably disposed in said bore;
a push rod extending along said center axis between a first end and a second end for moving said at least one brake piston in said bore with said second end being coupled to a brake pedal for allowing a user to manually move said at least one brake piston;
a housing, attached to said master cylinder block, defining a channel extending through said housing and receiving said push rod and allowing said push rod to be slidable in said housing;

an actuator coupled to said at least one brake piston for driving said at least one brake piston axially along said center axis between an opened position and a compressed position;

said push rod including a body portion and an end portion with said body portion being slidably disposed in said channel and said end portion being in an abutment relationship with said housing, said end portion defining a hole extending from said first end to said body portion; and said housing defining a first pocket and a second pocket, spaced apart from one another, extending annularly about said body portion of said push rod wherein said first pocket is in communication with said hole and a reservoir and said second pocket is communication with a pedal feel emulator, wherein said push rod defines a passage extending along said push rod and in communication with said hole to establish fluid communication between said first pocket and said hole; and said housing defining a first pathway in fluid communication with said reservoir and said first pocket to allow said reservoir to supply brake fluid to said hole, wherein the pedal brake assembly further includes a pedal apply pressure sensor disposed in said first pathway between said reservoir and said first pocket for monitoring fluid pressure in said first pathway.

15. The pedal brake assembly as set forth in claim 14 wherein said push rod includes a flange, located in said second pocket, and extending radially outwardly from said center axis dividing said second pocket into a first space and a second space.

16. The pedal brake assembly as set forth in claim 15 wherein said housing defines a second pathway in communication with said first space and said pedal feel emulator for providing a brake fluid pressure to said push rod to provide a resistance.

17. The pedal brake assembly as set forth in claim 16 further including a feel pressure sensor disposed in said second pathway between said pedal feel emulator and said first space for monitoring fluid pressure in said second pathway.

* * * * *